United States Patent
van Zuilekom et al.

(10) Patent No.: US 11,408,240 B2
(45) Date of Patent: Aug. 9, 2022

(54) DOWNHOLE ACID INJECTION TO STIMULATE FORMATION PRODUCTION

(71) Applicant: Halliburton Energy Services, Inc., Houston, TX (US)

(72) Inventors: Anthony Herman van Zuilekom, Houston, TX (US); Christopher Michael Jones, Katy, TX (US); Darren George Gascooke, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/112,665

(22) Filed: Dec. 4, 2020

(65) Prior Publication Data

US 2021/0238941 A1 Aug. 5, 2021

Related U.S. Application Data

(60) Provisional application No. 62/969,734, filed on Feb. 4, 2020.

(51) Int. Cl.
*E21B 27/02* (2006.01)
*C09K 8/74* (2006.01)

(52) U.S. Cl.
CPC ............... *E21B 27/02* (2013.01); *C09K 8/74* (2013.01)

(58) Field of Classification Search
CPC .................................. E21B 27/02; C09K 8/74
USPC ....................................................... 166/279
See application file for complete search history.

(56) References Cited

U.S. PATENT DOCUMENTS

| | | |
|---|---|---|
| 5,065,619 A | 11/1991 | Myska |
| 6,076,046 A | 6/2000 | Vasudevan et al. |
| 7,066,284 B2 | 6/2006 | Wylie et al. |
| 7,182,136 B2 | 2/2007 | Dalrymple et al. |
| 7,225,879 B2 | 6/2007 | Wylie et al. |
| 7,341,117 B2 | 3/2008 | Wylie et al. |
| 7,398,825 B2 | 7/2008 | Nguyen et al. |
| 7,441,598 B2 | 10/2008 | Nguyen |
| 7,571,777 B2 | 8/2009 | Wylie et al. |
| 7,589,048 B2 | 9/2009 | Eoff et al. |

(Continued)

OTHER PUBLICATIONS

PCT Application No. PCT/US2020/063615; International Search Report: dated Mar. 18, 2021, 3 pages.

(Continued)

*Primary Examiner* — Crystal J. Lee
*Assistant Examiner* — Ashish K Varma
(74) *Attorney, Agent, or Firm* — Delizio, Peacock, Lewin & Guerra

(57) ABSTRACT

A downhole tool for performing an acid stimulation operation includes a chamber and at least one acid resistant container to store a stimulation fluid comprising a stimulation acid. The at least one acid resistant container can be placed in the chamber prior to conveying the downhole tool in a borehole. The downhole tool can include a fluid injector fluidly coupled to an output of the chamber. After the downhole tool is positioned at a location in the borehole where the stimulation fluid is to be injected into a subsurface formation surrounding the borehole, the at least one acid-container can be opened such that the stimulation fluid can flow from the output of the chamber to the fluid injector. The fluid injector can inject the stimulation fluid into the subsurface formation.

20 Claims, 9 Drawing Sheets

(56) References Cited

U.S. PATENT DOCUMENTS

| | | |
|---|---|---|
| 7,595,283 B2 | 9/2009 | Eoff et al. |
| 7,730,950 B2 | 6/2010 | Nguyen et al. |
| 7,759,292 B2 | 7/2010 | Eoff et al. |
| 7,934,557 B2 | 5/2011 | Nguyen |
| 7,963,327 B1 | 6/2011 | Saleri et al. |
| 7,998,910 B2 | 8/2011 | Todd |
| 8,011,446 B2 | 9/2011 | Wylie et al. |
| 8,177,958 B2 | 5/2012 | Lawrence et al. |
| 8,181,703 B2 | 5/2012 | Sierra et al. |
| 8,278,250 B2 | 10/2012 | Dalrymple et al. |
| 8,418,546 B2 | 4/2013 | Elshahawi et al. |
| 8,420,576 B2 | 4/2013 | Eoff et al. |
| 8,555,969 B2 | 10/2013 | Goodwin et al. |
| 8,921,768 B2 | 12/2014 | Jones et al. |
| 8,962,535 B2 | 2/2015 | Welton et al. |
| 9,140,109 B2 | 9/2015 | Suarez-Rivera et al. |
| 2011/0065614 A1* | 3/2011 | Walker .................... C23F 11/04 507/268 |
| 2015/0361791 A1* | 12/2015 | Gisolf .................... E21B 49/08 166/264 |
| 2016/0362598 A1* | 12/2016 | Liu ......................... C09K 8/54 |
| 2018/0127642 A1* | 5/2018 | Al-Mutairi .............. E21B 43/26 |
| 2019/0292866 A1* | 9/2019 | Ross ....................... E21B 47/06 |

OTHER PUBLICATIONS

PCT Application No. PCT/US2020/063632; International Search Report: dated Mar. 18, 2021, 4 pages.

PCT Application No. PCT/US2020/063615; Written Opinion: dated Mar. 18, 2021, 5 pages.

PCT Application No. PCT/US2020/063632; Written Opinion: dated Mar. 18, 2021, 5 pages.

* cited by examiner

500

| | ETFE | FEP/TFE/PFA | FLPE | FLPP | HDPE | LDPE | PC | PETG | PP | PVC | TPE gaskets |
|---|---|---|---|---|---|---|---|---|---|---|---|
| Acids, dilute or weak | E | E | E | E | E | E | E | E | E | E | G |
| Acids, strong/concentrated ** | E | E | G | G | G | G | G | N | G | G | F |
| Alcohols, aliphatic | E | E | E | E | E | E | G | G | E | G | E |
| Aldehydes | E | E | G | G | G | G | G | G | G | G | G |
| Bases/Alkali | E | E | F | E | E | E | N | N | E | E | F |
| Esters | G | E | G | G | G | G | N | G | G | N | N |
| Hydrocarbons, aliphatic | E | E | E | G | G | F | G | G | G | G | E |
| Hydrocarbons, aromatic | G | E | E | N | N | N | N | N | N | N | N |
| Hydrocarbons, halogenated | G | E | G | F | N | N | N | N | N | N | F |
| Ketones, aromatic | G | E | G | G | N | N | N | N | N | F | N |
| Oxidizing Agents, strong | E | E | F | F | F | F | F | F | F | G | N |

\* not for tubing chemical resistance (except PVC)
\*\* except for oxidizing acids (see oxidizing agents, strong)
E – Excellent, G – Good, F- Fair, N – Not Recommended

FIG. 5

DOWNHOLE ACID INJECTION TO STIMULATE FORMATION PRODUCTION

TECHNICAL FIELD

The disclosure generally relates to downhole formation production, and more particularly to downhole acid injection to stimulate formation production.

BACKGROUND

Acid is often used to stimulate formation production. Usually a small-scale test can be performed on a formation to test the viability of acid treatment to improve permeability and/or mobility improvement within the formation. However, even small-scale tests can require significant effort and are usually performed with expensive and specialized tubing equipment and transportation methods. Further, a wireline or drillstem testing (DST) crew may be needed to measure permeability both before and after the acid treatment. Thus, numerous trips can be required to conduct these activities. First, the wireline or DST tester is lowered into a borehole and a formation mobility measurement is taken at a specified depth. Then, the wireline or DST is removed. Next, a coiled tubing is deployed downhole for acid injection at the same location at which the formation mobility measurement was taken. The coil tubing is then withdrawn from the borehole. Finally, the wireline tester or DST can be removed. In addition to deploying and removing numerous tools downhole, the locations of these trips can vary. Therefore, the mobility comparisons may not be accurate due to inconsistencies in measurement and acid injection locations. Thus, the quality of the test may be compromised.

BRIEF DESCRIPTION OF THE DRAWINGS

Embodiments of the disclosure may be better understood by referencing the accompanying drawings.

FIG. 5 depicts a table of example materials from which an acid-resistant container can be composed and their expected performance based on a type of acid stored therein.

DESCRIPTION OF EMBODIMENTS

Figure 1A:
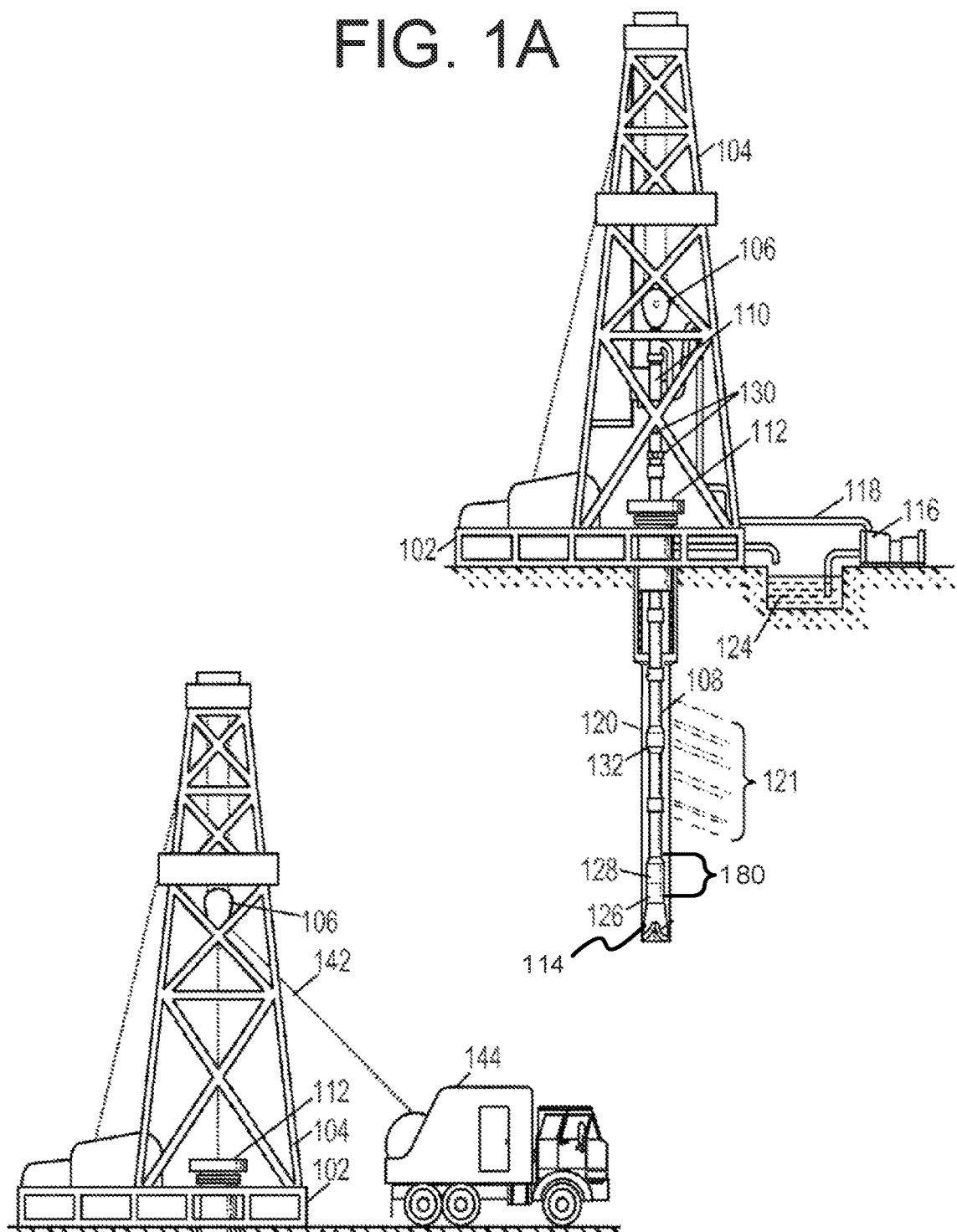
FIG. 1A depicts an illustrative logging while drilling (LWD) system, according to some embodiments.

The description that follows includes example systems, methods, techniques, and program flows that embody aspects of the disclosure. However, it is understood that this disclosure may be practiced without these specific details. For instance, this disclosure refers to acid resistant containers for acid injection to stimulate formation production in illustrative examples. Embodiments of this disclosure can be also applied to other types of fluids and/or for other types of applications downhole. In other instances, well-known instruction instances, protocols, structures, and techniques have not been shown in detail in order not to obfuscate the description.

Various embodiments can used for downhole acid injection to stimulate formation production. Conventionally, injection of acid into a formation is not performed by formation testers of a downhole tool because the acid can destroy or damage the downhole tool when injected from the downhole tool and into the formation. Also, handling the acid when transporting it for placement within the downhole tool can be dangerous, as operators or crew may be exposed to harmful acids. The use of pre-packaged containers with an acid-resistant coating, as further described below, in addition to coating parts of the downhole tool exposed to the acid can enable both the safe transport of containers holding acid and the protection of the downhole tool. Such embodiments can improve the quality of the acid testing, reduce tripping time, and reduce rescue cost. Some embodiments include an apparatus and method to enable a wireline formation tester (or Logging While Drilling (LWD) formation tester) to carry containers of stimulation fluid downhole. For the purposes of this application, the term "stimulation fluid" is to be understood to include but not be limited to a stimulation acid. The pre-packaged acid-resistant containers containing stimulation fluid can be placed in a sample chamber of the downhole tool at the surface prior to deploying any tools downhole. In such embodiments, the stimulation fluid can include a stimulation acid and can be injected into the formation. After allowing for time for the injected acid to react with the formation, the viability of acid stimulation for oil recovery can be determined.

The sample chamber of the downhole tool can store one or more acid-resistant containers that store the stimulation fluid. The chamber may be a chamber in a wireline formation tester or an LWD formation tester. The acid-resistant containers can have burst discs or check valves designed to release the acid contents of the containers upon over pressurization. The burst disc or a check valve of the acid-resistant containers can also be acid-resistant.

In some embodiments, the sample chamber and a tool flow line can be coated with an acid-resistant coating. Examples of the acid-resistant coating can include aluminum oxide, titanium oxide, interlaced layers of aluminum oxide and titanium oxide, wax, plastic, and other acid resistant coatings. The coating may be liquid, solid, gel or mixed phase. The coating may be applied in a liquid or gas form in at a time prior to disposal of a formation tester downhole to promote stability upon use of the formation tester. The coating may be stable for long periods before the intended contact of the formation tester with acid and therefore may be coated long before the intended use. Examples of such coatings may include, but are not limited to, aluminum oxide, titanium oxide, or interlaced layers of aluminum oxide and titanium oxide. Some coatings may be stable for shorter periods of time, and therefore may require coating immediately prior to, or even during, the intended contact of the formation tester with acid. Examples of such coatings may include, but are not limited to, wax or plastic. In some embodiments, the coating can be applied to the flow line downhole, prior to injecting the acid into the formation.

An acid-resistant fluid can be carried with the formation tester in an isolated container and injected into the flow line of the downhole tool to coat the flow line. In some embodiments, an acid-resistant liner may be inserted into an interior of the container to protect the container from the acid during use. In some implementations, parts of the downhole tool that are exposed to the acid may be neutralized or scrubbed using a neutralizing compound (e.g., caustic wellbore fluid) after acid injection to provide further protection of the downhole tool. A neutralizing fluid may also be carried with the formation tester in an isolated container and injected into the flow line of the formation tester after acid injection.

As further described below, some implementations can include individual containers of acid to enable a controlled release of acid from specific containers. This can increase the precision of a volume of acid released into the wellbore during acid injection operations. A downhole tool may house multiple acid-resistant containers within the sample chamber. This allows for easier loading of the containers into the downhole tool prior to use, as the size of the containers can be reduced. Additionally, if the containers are not opened downhole, the containers can be returned to the surface to allow for easier and safer management of extraction of the acid from the downhole tool.

Example Systems

FIG. 1A depicts an illustrative logging while drilling (LWD) system, according to some embodiments. A drilling platform 102 supports a derrick 104 having a traveling block 106 for raising and lowering a drill string 108. A top drive 110 supports and rotates the drill string 108 as the string is lowered through a well head 112. The drill string's rotation (and/or a downhole motor) drives a drill bit 114 to extend a borehole 120 through subsurface earth formations 121. Mud recirculation equipment 116 draws drilling fluid from a retention pit 124 and pumps it through a feed pipe 118 to the top drive 110, through the interior of the drill string 108 to the drill bit 114, through orifices in drill bit, through the annulus around the drill string 108 to a blowout preventer at the surface, and through a discharge pipe into the retention pit 124. The drilling fluid transports cuttings from the borehole 120 into the retention pit 124 and aids in maintaining borehole integrity.

One or more logging tools 126 are integrated into a bottomhole assembly 180 near the drill bit 114. Suitable logging tools include formation fluid sampling tools, acoustic logging tools, electromagnetic resistivity tools, and nuclear magnetic resonance tools, among others. Logging while drilling tools usually take the form of a drill collar, i.e., a thick-walled tubular that provides weight and rigidity to aid the drilling process. As the bit extends the borehole 120 through the formation 121, the logging tool(s) 126 can collect measurements of formation characteristics. Other tools and sensors can also be included in the bottomhole assembly 180 to gather measurements of various drilling parameters such as position, orientation, weight-on-bit, borehole diameter, etc. A control/telemetry module 128 collects data from the various bottomhole assembly instruments (including position and orientation information) and stores them in internal memory. Selected portions of the data can be communicated to surface receivers 130 by, e.g., mud pulse telemetry. Other logging-while drilling telemetry methods also exist and could be employed. For example, electromagnetic telemetry or through-wall acoustic telemetry can be employed with an optional repeater 132 to extend the telemetry range. As another example, the drill string 108 could be formed from wired drill pipe that enables waveforms or images to be transmitted to the surface in real time to enable quality control and processing to optimize the logging resolution. Most telemetry systems also enable commands to be communicated from the surface to the control and telemetry module to configure the operation of the tools.

Figure 1B:
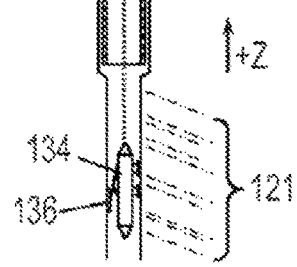
FIG. 1B depicts an illustrative wireline system, according to some embodiments.

At various times during the drilling process, the drill string 108 may be removed from the borehole 120 for wireline logging operations. For example, FIG. 1B depicts an illustrative wireline system, according to some embodiments. Once the drill string has been removed, logging operations can be conducted using a logging tool 134. The logging tool 134 may be suspended by a conveyance 142. The conveyance 142 may include any suitable means for providing mechanical conveyance for the logging tool 134, including, but not limited to, wireline, slickline, coiled tubing, pipe, drill pipe, downhole tractor, or the like. In some embodiments, the conveyance 142 may provide mechanical suspension, as well as electrical connectivity, for the logging tool 134. The conveyance 142 may comprise, in some instances, a plurality of electrical conductors extending from a vehicle located at the surface. The conveyance 142 may or may not have conductors for transporting power to the tool and telemetry from the tool to the surface. The logging tool 134 may have pads 136 and/or centralizing springs to maintain the tool near a longitudinal axis of the borehole. As explained further below, the logging tool 134 can include an injector for acid injection of acid into the formation to test the viability of permeability improvement by acid treatment. A logging facility 144 collects measurements from the logging tool 134 and includes a computer system for processing and storing the measurements gathered by the logging tool 134.

Example Downhole Tool

Figure 2:
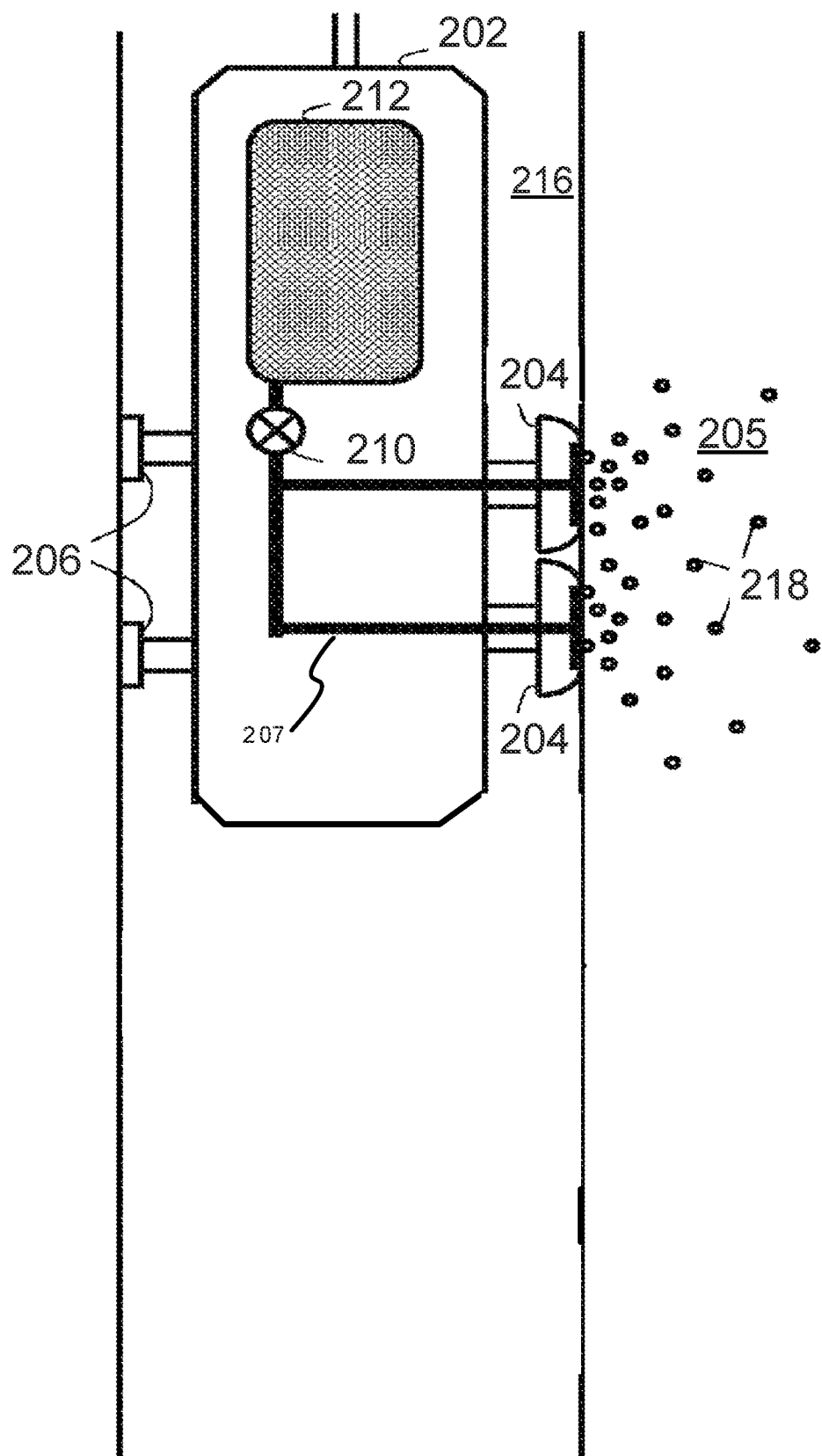
FIG. 2 depicts an illustrative downhole tool for acid injection treatment, according to some embodiments.

FIG. 2 depicts an illustrative downhole tool for acid injection treatment, according to some embodiments. A downhole tool 202 can include one or more injectors 204 terminated by cup-shaped sealing pads. The sealing pads may contact a borehole wall when the downhole tool 202 is positioned downhole in a formation 205. Arms 206 may extend from the downhole tool 202 opposite from the injectors 204. The arms 206 may contact the borehole wall and push the downhole tool 202 such that the sealing pads of the injectors 204 create a seal between the injectors 204 and the formation 205. The injectors 204 may be coupled via a flow line 207. The flow line 207 can move fluid between a sample chamber 212 and the formation 205. In some embodiments, the flow line 207 may be coated with an acid-resistant coating. The sample chamber 212 may also be coated with an acid-resistant coating.

As further described below, the sample chamber 212 can include one or more acid-resistant containers to store acid. The containers can be pre-packaged canisters of acid, neutralizing solutions, or mixtures of acids and acid-resistant fluids. The containers can be placed into the sample chamber 212 at the surface. The containers can include burst discs, check valves, and/or actuatable valves designed to release the acid contents upon over pressurization.

Additionally, a valve 210 can be opened and an acid 218 can be emitted into the formation 205 and diffused through the cracks, pores, and voids of the formation 205. After a triggering event, a pump (not pictured) can withdraw a volume of fluid from the formation 205 and deposit the fluid in a sample chamber. Multiple sample chambers can be included in a rotating cartridge to enable multiple samples to be captured at different times and, if desired, at different locations in the borehole. In some embodiments, an additional port can be provided to enable fluids to be sampled from the formation or borehole or exhausted to a borehole annulus 216 or the formation 205. The sequence in which fluids are withdrawn from or injected to the formation, the reservoir, the sample chambers, and the borehole annulus can be varied as desired by the operator. While described in reference to an injector emitting acid from the downhole tool, any other type of component can be used for emission. For example, a packer having a probe built in to emit fluids from the downhole tool into the formation can be used for acid emission from the downhole tool.

In other embodiments, after the acid 218 is emitted into the formation 205, a neutralizing compound can be backflowed into any portion of the downhole tool that has been exposed to the acid. This can include the flow line 207, the valve 210, the sampling chamber 212, and other parts of the downhole tool. A neutralizing compound can also be stored in a separate chamber in the downhole tool and used to backflow portions of the downhole tool and neutralize residual acid. In some embodiments, the neutralizing compound can be drilling fluid. Because drilling fluid is typically caustic, drilling fluid or its filtrate may also be backflowed to neutralize residual acid in a formation tester.

Example Acid-Resistant Containers

Figure 3:
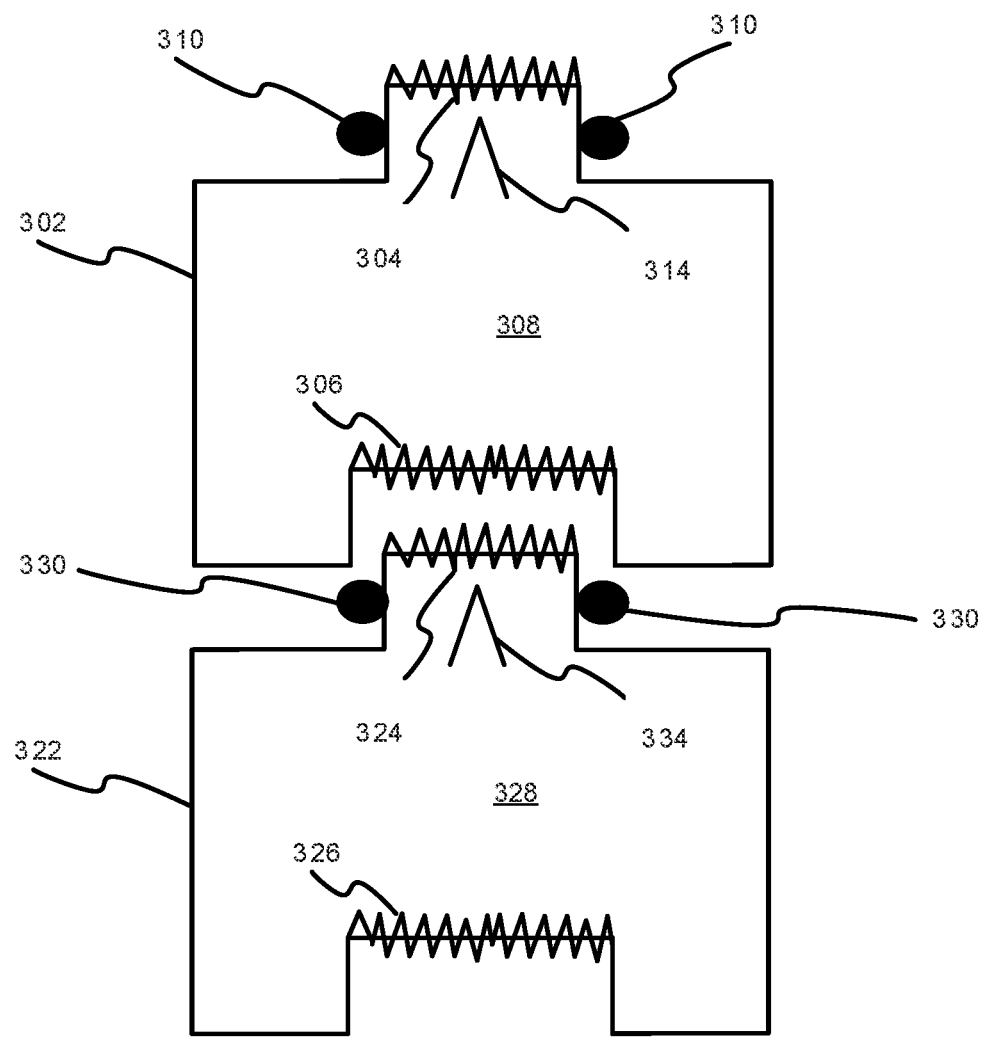
FIG. 3 depicts multiple acid-resistant containers to be loaded into a sample chamber of a downhole tool, according to some embodiments.
Figure 4:
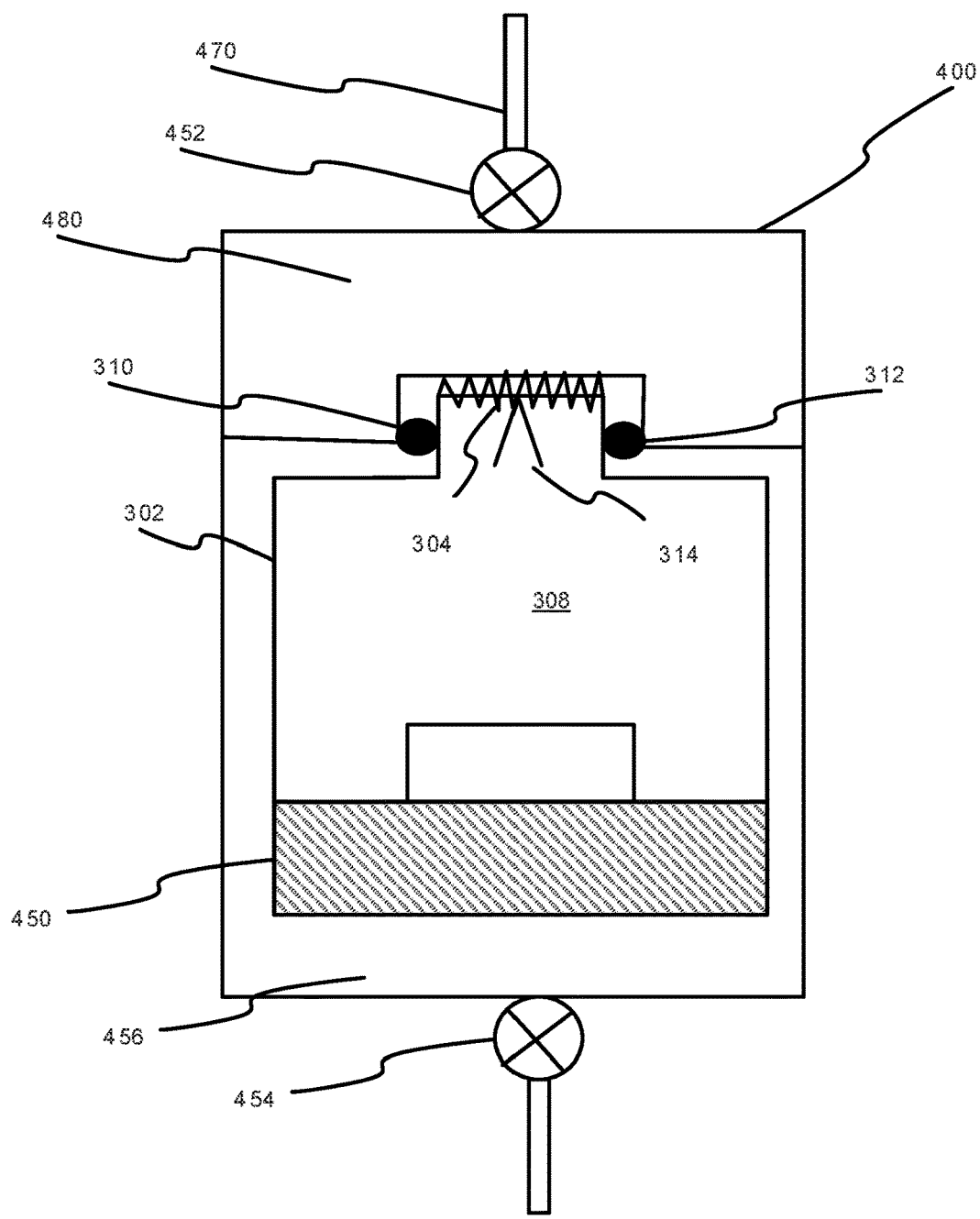
FIG. 4 depicts the multiple acid-resistant containers of FIG. 3 loaded into the sample chamber of a downhole tool, according to some embodiments.

A first example of acid-resistant containers having a piston external to the acid-resistant container is now described in reference to FIGS. 3-4.

Figure 6:
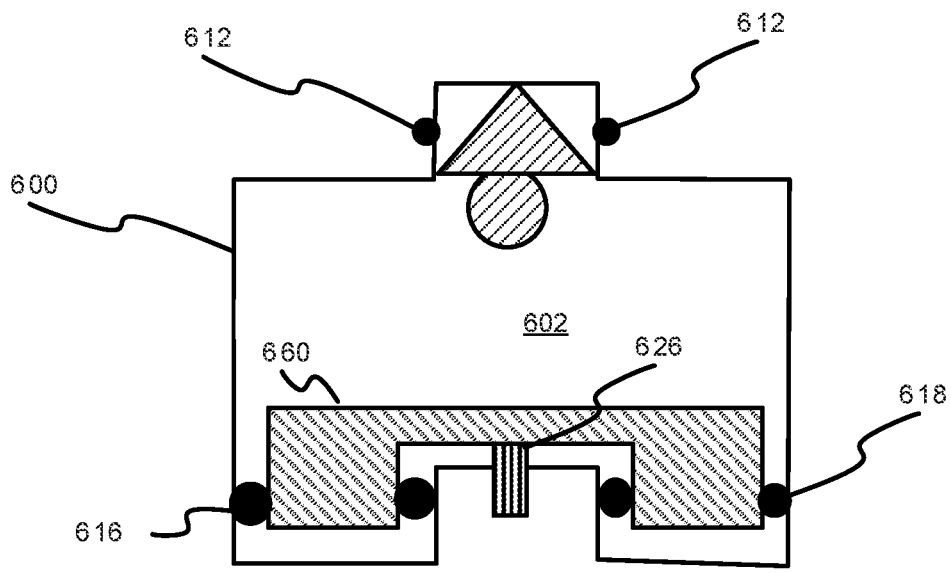
FIG. 6 depicts an example acid-resistant container that includes a piston therein and that is to be loaded into a sample chamber of a downhole tool, according to some embodiments.
Figure 7A:
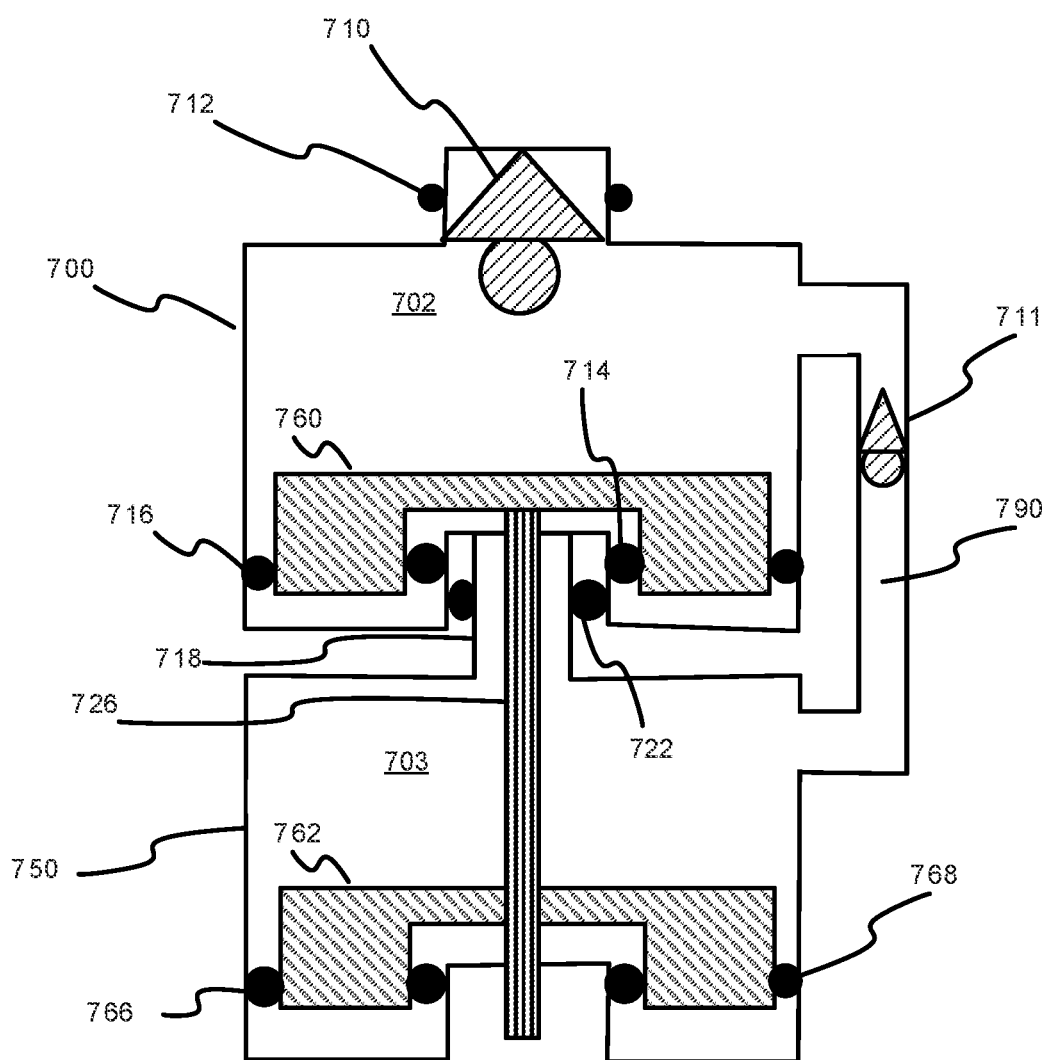
FIG. 7A depicts multiple acid-resistant containers of FIG. 6 at a first point in time when opening multiple acid-resistant containers, according to some embodiments.
Figure 7B:
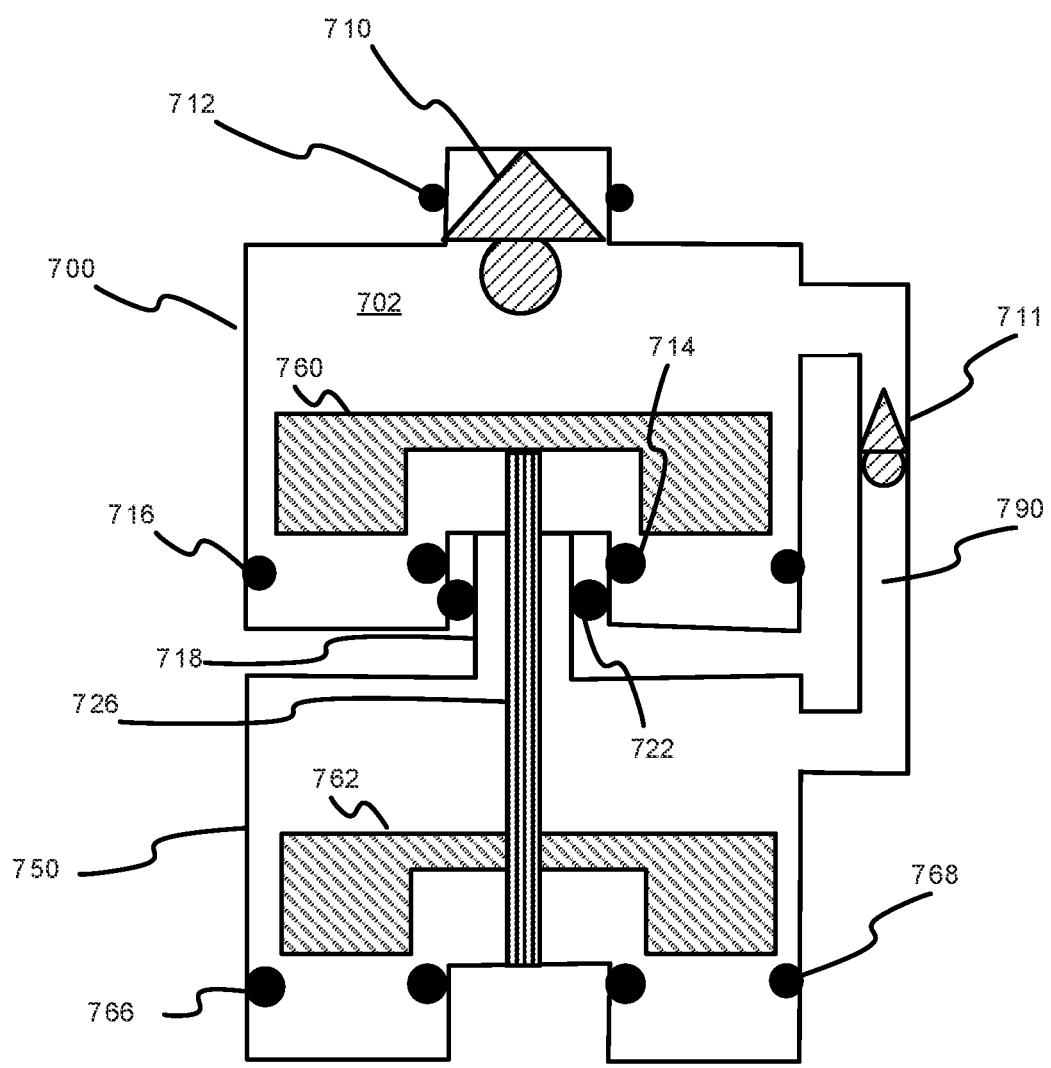
FIG. 7B depicts the multiple acid-resistant containers of FIG. 7A at a second point in time when opening multiple acid-resistant containers, according to some embodiments.

FIG. 3 depicts multiple acid-resistant containers to be loaded into a sample chamber of a downhole tool, according to some embodiments. FIG. 3 depicts an acid-resistant container 302 and an acid-resistant container 322. The acid-resistant container 302 may store an acid 308, and the acid-resistant container 322 may store an acid 328. A burst disc 304 may be positioned at a raised portion of the acid-resistant container 302. A burst disc 306 may be positioned at an indented portion of the acid-resistant container 302. The burst discs 304 and 306 can be made of a chemically compliment material such as graphite, plastic, ceramic, or other chemically compliant materials. A spike 314 can be positioned within the acid-resistant container 302 below the burst disc 304. An o-ring seal 310 can be positioned around the raised portion of the acid-resistant container 302. A burst disc 324 can be positioned at a raised portion of the acid-resistant container 322. A burst disc 326 can be positioned at an indented portion of the acid-resistant container 322. A spike 334 can be positioned within the acid-resistant container 322 below the burst disc 324. An o-ring seal 330 can be positioned around the raised portion of the acid-resistant container 322. As further described below, the acids 308 and 328 can be released from their respective acid-resistant containers 302 and 322 for injection into a surrounding formation after the downhole tool is positioned in a borehole. The acids 308 and 328 can be different types of acids (such as hydrochloric acid, sulfuric acid, hydrofluoric acid, citric acid or nitric acid, and combinations therein). A piston may be included in the sample chamber and external to the acid-container, as depicted in FIG. 4. In other embodiments, the piston may be internal to the acid container, as depicted in FIGS. 6, 7A, and 7B.

If external to the container, then the external piston may crush the container thereby reducing the internal volume of the container and expelling the acid under pressure. For example, a piston can be below the acid-resistant container 322 and move upward, thereby causing the raised portion of the acid-resistant container 322 to come into contact with the indented portion of the acid-resistant container 302. The piston can continue to move upward to cause the spike 334 to puncture through the burst disc 324 and the burst disc 306. The acid 328 can then be mixed with the acid 308 in the acid-resistant container 302. Both acid-resistant containers 302 and 322 can be within a sample chamber such that a force applied by the piston can cause the acid 308 to be released from the acid-resistant container 302 and the acid 328 to be released from the acid-resistant container 322.

In some implementations, the acid-resistant containers 302 and 322 may contain an internal bladder as a mechanism for opening the acid container in place of a piston. In alternative embodiments, the bladder may be external to the acid-resistant containers 302 and 322 and within the sample chamber. The bladder can inflate to decrease an internal volume of the acid container and increase an internal pressure such that the container ruptures from over pressurization, thereby expelling the acid. In some embodiments, the acid-resistant containers 302 and 322 may be underfilled to allow for fluid expansion as temperature increases downhole to reduce a risk of the acid-resistant containers 302 and 322 unintentionally bursting or leaking.

As shown, acids can be stored in multiple containers such that the acids are released from their containers when the acids are to be injected into the formation. The acids from the different containers may mix when the containers are opened and injected when the acids are to be injected into the formation. The containers may contain similar or dissimilar acids. Conventionally, acids are stored in one large container for acid injection downhole, rather than multiple smaller containers. However, this can lead to wasted acid, as it is difficult to control the volume of acid expelled downhole with fine precision. Additionally, loading a single large container of acid is labor intensive and exposes crew to a greater potential risk for harm in the case that the container leaks or bursts and a large amount of acid is released. With reference to the containers described herein, if acid from a container is not expelled downhole, the container and its contents can instead be returned to the surface and safely removed, as acid can remain in the individual container that was not opened, reducing waste. Loading and unloading smaller acid-resistant containers is also safer, as the containers are easier to transport and contain smaller amounts of acid. By separating the acid into multiple containers, Health, Safety, and Environment (HSE) risks can be reduced. For example, if one of the containers leaks and the others remain intact only cleanup of acid from the one container, rather than acid from all of the containers, is needed.

FIG. 4 depicts one of the acid-resistant containers of FIG. 3 loaded into a sample chamber of a downhole tool, according to some embodiments. The acid-resistant container 302 may be placed within a sample chamber 400. While only one acid-resistant container 302 is depicted, multiple acid-resistant containers can be configured within the sample chamber 400. The acid-resistant container 302 can store the acid 308 and can include the burst disc 304, the spike 314, and the o-ring seal 310 (as described above in reference to FIG. 3). In an example operation, a valve 452 and a valve 454 can be opened. A piston 450 located within the sample chamber 400 and external to the acid-resistant container 302 may be hydraulically actuated by opening the valve 454 and flowing a fluid into an interior 456 of the sample chamber 400. A pump (not pictured) may pump the fluid through the valve 454, thereby causing the piston 450 to move up in the sample chamber 400. In some implementations, the piston 450 may be electrically actuated, or actuated by any other actuation mechanisms known to those skilled in the art. For example, a nitrogen charge can be used to move the piston 450 up in the sample chamber 400. Pressure may be directly applied to the acid-resistant container or applied indirectly via the piston or other hydraulic means. Alternatively, exposing the acid-resistant containers 302 and 322 to a pressure of a borehole itself can be sufficient to cause the containers to open.

As the piston 450 continues to move up, the acid-resistant container 302 can burst as the spike 314 punctures the burst disc 304. The acid 308 can then flow into a section 480 of the sample chamber 400 and out through the valve 452 into a flow line 470. In some implementations, the flow line 470 may be coated with an acid-resistant coating. The flow line 470 can be coupled to an injector such that the acid is then emitted into the surrounding formation. Accordingly, the pump is then not exposed to the acid, thereby not exposing the pump to any potential damage from exposure to the acid. The pump oil may contain a mildly basic compound such as amines and may be composed of a generally inert fluid such as CF40, liquid versions of helium, neon, argon, or contain a corrosion inhibitor. Any part of the formation tester, including the pump, may be treated to be oil wet in order to minimize aqueous acid from invading crevices and capillaries that retain that acid for long periods of time.

The acid-resistant containers 302 and 322 can be disposable plastic bags, reusable plastic containers, etc. In some embodiments, the acid-resistant containers can be composed of pliable material (e.g., rubber, silicon, plastic, mylar, etc.). In some embodiments, the sample chamber 400 may be converted into a chamber/container pair by coating the sample chamber 400 with a conformal coating such as, but not limited to, plastic or wax, aluminum oxide, titanium oxide, or titanium oxide and aluminum oxide interlaced coatings. In those embodiments, the conformal coating can act as a container and the sample chamber 400 can provide structural support for the container.

In some embodiments, an acid-resistant fluid to coat a flow line can be included with an acid in the acid-resistant containers. For example, with reference to FIG. 4, an acid-resistant fluid can be housed within the acid-resistant container 302 in addition to the acid 308. The acid-resistant fluid may be mixed with the acid 308 such that when the acid 308 is released into the flow line 470 the acid-resistant fluid is also released and coats the flow line 470 with an acid-resistant coating. With reference to FIG. 2, a container within the sample chamber 212 housing a mixture of the acid 218 and an acid-resistant fluid can emit the acid/acid-resistant fluid mixture into the flow line 207 simultaneously. As the acid/acid-resistant fluid mixture flows through the flow line 207, the acid-resistant fluid can coat the flow line 207 with an acid-resistant coating.

In some embodiments, the sample chamber 400 can be filled with a buffer material. The acid-resistant containers 302 and 322 may be submerged in the buffer material. The buffer material may be a compliant material such as, but not limited to, a gel or other thick viscus liquids, a powder, or a foam. The buffer material may minimize the physical contact between the acid-resistant containers 302 and 322 and the sample chamber 400. The buffer material can also prevent the acid-resistant containers 302 and 322 from unintentionally contacting each other. When a pressure is applied, the buffer material can compress and allow for the acid-resistant containers 302 and 322 to come into contact with each other. The buffer material may also prevent inadvertent damage to the acid-resistant containers 302 and 322 inside the sample chamber 400 upon handling and prior to pressurization.

In some embodiments, the buffer material can contain, in whole or in part, a neutralizing compound. Accordingly, if one of the acid-resistant containers 302 and 322 bursts or leaks prematurely and the acid(s) 308 and/or 328 are released into the sample chamber 400, the buffer material containing a neutralizing compound may neutralize the acid(s) 308 and/or 328 and prevent damage to the sample chamber 400 that may arise from direct exposure to acid. The buffer material may also prevent inadvertent damage to the acid-resistant containers 302 and 322 inside the sample chamber 400 upon handling and prior to pressurization.

FIG. 5 depicts a table of example materials from which an acid-resistant container can be composed and their expected performance based on a type of acid stored therein. A table 500 includes a list of the example materials that include (1) Ethylene tetrafluoroethylene (ETFE), (2) Fluorinated ethylene propylene (FEP)/Tetrafluoroethylene (TFE)/Perfluoroalkoxy Polymer-Chemical Compound (PFA), (3) Fluorinated High Density Polyethylene (FLPE), (4) High-density polyethylene (HDPE), (5) low density polyethylene (LDPE), (6) Polycarbonates (PC), (7) Polyethylene terephthalate (PETG), (8) Polypropylene (PP), (9) Polyvinyl chloride (PVC), and (10) Thermoplastic elastomers (TPE) gaskets. The table 500 assigns a rating to each material based on the ability of a coating of the material to remain intact when a fluid is stored therein. The depicted ratings include E—Excellent, G—Good, F—Fair, and N—Not recommended. A fluid and material combination rated E, ETFE and strong acid for example, can be stored for a longer period of time than a fluid and material combination rated F, TPE and strong acid for example, because an ETFE coating can withstand longer exposure to a strong acid before the coating material begins to corrode, as compared to a TPE coating. Some E-rated combinations may be stored for months with minimal risk of damage to the containers, whereas N-rated combinations may only be stable for a few hours. Containers having conformal coatings such as wax or plastic, coatings of one or more of the materials listed above, and/or coatings such as aluminum oxide, titanium oxide, or interlaced aluminum oxide or titanium oxide may also be used to create a sample chamber/container pair, as discussed in reference to FIGS. 3-4.

In some embodiments, the materials of the table 500 can be used to coat portions of a downhole tool. For example, with reference to FIG. 2, a material of the table 500 that is resistant to the acid 218 can be used to coat the flow line 207 prior to injection of the acid 218. With further reference to FIGS. 2 and 5, the acid 218 may be a strong acid and the material used to coat the flow line 207 can be TFE. Alternatively or in addition, an acid-resistant material can be mixed or included with the acid in the container. For example, an acid-resistant material of the table 500 may be mixed with an acid and stored within a container to be opened downhole. As the container is opened, the acid-resistant material can coat the flow line with an acid-resistant coating as the acid and acid-resistant mixture flows through the flow line. Alternatively or in addition, the acid-resistant material may be stored in a container in the downhole tool separate from the acid to be injected. In some embodiments, the acid-resistant fluid can be a material of the table 500. In other embodiments, the acid-resistant fluid can be any fluid resistant to the acid to be injected into a formation.

A second example of the acid-resistant containers wherein a piston is located within the acid-resistant container is now described with reference to FIGS. 6 and 7A-7B.

FIG. 6 depicts an example acid-resistant container that includes a piston therein and that is to be loaded into a sample chamber of a downhole tool, according to some embodiments. An acid-resistant container 600 may include a check valve 610 in a top-raised portion of the acid-resistant container 600. The acid-resistant container 600 can store an acid 602. A piston 660 may be located within a bottom portion of the acid-resistant container 600. A pin 626 can be positioned below and adjacent to the piston 660 in a lower indented portion of the acid-resistant container 600. The pin 626 may extend external to the acid-resistant container 600. In some embodiments, the pin 626 may be coupled to a motor (not pictured) that actuates the piston 660. An o-ring seal 612 can be positioned around the top-raised portion of the acid-resistant container 600. An o-ring seal 616 and an o-ring seal 618 can be positioned on the left side and right side, respectively, of the piston 660. Example operations of the acid-resistant container 600 are now described in reference to FIGS. 7A-7B.

FIG. 7A depicts multiple acid-resistant containers of FIG. 6 at a first point in time when opening multiple acid-resistant containers, according to some embodiments. FIG. 7A depicts an acid-resistant container 700 and an acid-resistant container 750. The acid-resistant container 700 can store an acid 702. A piston 760 can be within a bottom portion of the acid-resistant container 700. A pin 726 is positioned below and adjacent to the piston 760 in a lower indented portion of the acid-resistant container 700. The pin 726 may extend through a small cut-out (not pictured) in the acid-resistant container 700 through a channel 718 of the acid-resistant container 750. The pin 726 may be coupled to a piston 762 within the acid-resistant container 750 and may further extend through a bottom of the acid-resistant container 750 such that a portion of the pin 726 is external to both the acid-resistant containers 700 and 750. The pin 726 may be coupled to both pistons 760 and 762 such that when one piston moves at a rate in a direction the other piston moves at the same rate in the same direction. An o-ring seal 712 can be positioned around the top-raised portion of the acid-resistant container 700. An o-ring seal 714 and an o-ring seal 716 can be positioned on the left side and right side, respectively, of an internal cutout of the piston 760. An o-ring seal 722 can be positioned around the channel 718.

An o-ring seal 766 and an o-ring seal 768 can be positioned on the left side and right side, respectively, of the piston 762. An external tube 790 may fluidly couple the acid-resistant container 750 to the acid-resistant container 700. The external tube 790 may also be internally coated with an acid-resistant material. A check valve 711 can be positioned within the external tube 790. The check valve 711 can be manipulable to allow or restrict the flow of an acid 703 from the acid-resistant container 750 to the acid-resistant container 700. The acid-resistant container 700 can also include a check valve 710 in the top-raised portion. The check valve 710 can be manipulable to allow or restrict a flow of the acid 702, or a mixture of the acids 702 and 703, from the acid-resistant container 700. The check valves 710 and 711 can be made of a chemically compliment material such as graphite, plastic, ceramic, or other chemically compliant materials.

FIG. 7B depicts the multiple acid-resistant containers of FIG. 7A at a second point in time when opening multiple acid-resistant containers, according to some embodiments. In FIG. 7B, the check valve 711 is opened to allow the acid 703 to flow from the acid-resistant container 750 into the acid-resistant container 700 through the external tube 790. The check valve 710 is opened and the pistons 762 and 760 are moved upward to force the flow of acid 703 through the external tube 790 into the acid-resistant container 700 while simultaneously ejecting the acids 702 and 703 from the acid-resistant container 700 through the opened check valve 710. In some implementations, the check valve 710 may not be opened at the same time as the check valve 711 to allow the acids 702 and 703 to mix prior to emitting a mixture of the acids 702 and 703 from the acid-resistant container 700.

Example Operations

Figure 8:
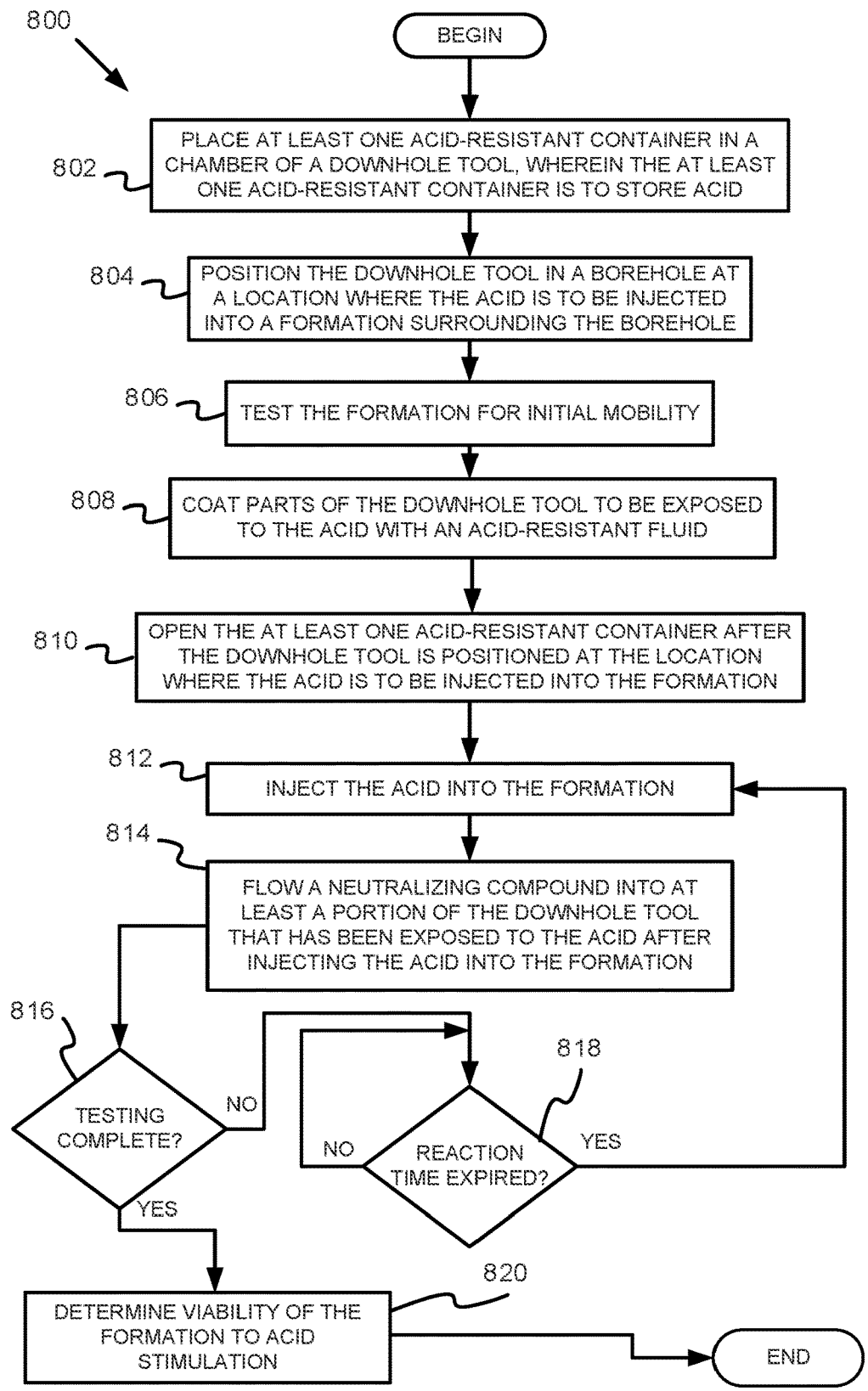
FIG. 8 depicts a flowchart of example operations for acid injection, according to some embodiments.

FIG. 8 depicts a flowchart of example operations for acid injection, according to some embodiments. Operations of a flowchart 800 are described in reference to the example system depicted in FIG. 1B. However, such operations can be performed in the example system depicts in FIG. 1A or other systems that include downhole operations.

At block 802, at least one acid-resistant container is placed in a chamber of a downhole tool, wherein the at least one acid-resistant container is to store acid. For example, with reference to FIG. 1B, at least one acid-resistant container can be place in a chamber of the logging tool 134. The acid can be housed in pre-packaged acid-resistant containers that can conform to the shape of the sample chamber that will be used as a delivery chamber. The container may be constructed of Teflon or other materials including, but not limited to, the materials shown in the table 500 of FIG. 5. Additionally, the container can be configured with a burst disc and a spike, or a check valve. The container can be configured to collapse under pressure. For example, with reference to FIG. 4, the acid-resistant container 302 having the burst disc 304 can be placed into the sample chamber 400.

At block 804, the downhole tool is positioned in a borehole at a location where the acid is to be injected into a formation surrounding the borehole. For example, after assembly, the downhole tool can be lowered downhole to a target zone. For example, with reference to FIG. 1B, the logging tool 134 can be lowered to a location within the borehole 120.

At block 806, the formation is tested for an initial mobility at this location. For example, with reference to FIG. 1B, the logging tool 134 can include sensor(s) and a processor to test the fluid from the formation to determine its initial mobility at the location. Alternatively or in addition, a computing device at the surface of the borehole can perform this test.

At block 808, parts of the downhole tool to be exposed to the acid are coated with an acid-resistant fluid. For example, with reference to FIG. 2, an acid-resistant fluid can be released from a chamber to coat the flow line 207. The acid-resistant fluid can also coat the injectors 204, the sample chamber 212, the valve 210, or other parts of the downhole tool to be exposed to acid. Alternatively or in addition, the coating may be performed at the surface prior to positioning the downhole tool in the borehole (i.e. prior to beginning the operations of the flowchart 800). The coating for instance may be aluminum oxide, titanium oxide, aluminum oxide interlaced with titanium dioxide, wax or plastic, or other suitable coatings that may be applied ahead of time, in the field, or even downhole. For example, with reference to FIG. 5, the acid-resistant fluid may be one of the materials of the table 500 that neutralize the associated acid stored in the at least one acid-resistant container.

At block 810, the at least one acid-resistant container is opened after the downhole tool is positioned at the location where the acid is to be injected into the formation. For example, with reference to FIG. 4, the acid-resistant container 302 is opened by over-pressurizing the contents of the acid-resistant container 302 by actuating the piston 450 and applying a force to the acid-resistant container 302 that causes the spike 314 to break through the burst disc 304.

At block 812, the acid is injected into the formation. In some embodiments, the injection rate is determined, at least in part, using the first tested mobility. For example, with reference to FIG. 4, the acid 308 is injected into the formation by opening the valve 452 so that the acid 308 can flow through the flow line 470 to an injector of the tool and into the formation.

At block 814, a neutralizing compound is flowed into at least a portion of the downhole tool that has been exposed to the acid after injecting the acid into the formation, including the flow lines, the valves, the sampling chamber, and/or any components of the downhole tool that may have been in contact with the acid. For example, after the injection, wellbore mud may be introduced into the tool and the sample chamber to promote scrubbing of the tool and neutralization of the acid by caustic components of the mud. Alternatively or in addition, a separate container in the logging tool can include a neutralizing compound that can be released into the parts of the tool exposed to the acid.

At block 816, a determination is made of whether testing is complete. For example, multiple mobility tests may be performed for comparison. Thus, additional mobility tests may be needed. The logging tool 134 and/or a computing device at the surface of the borehole can make this determination. If testing is complete, operations of the flowchart continue at block 820 (further described below). Otherwise, operations continue at block 818.

At block 818, a determination is made of whether a reaction time has expired since the acid injection. For example, with reference to FIG. 1B, the logging tool 134 and/or a computing device at the surface of the borehole can make this determination. The reaction time may be monitored by downhole fluid identification techniques. For example, the reaction may be monitored by monitoring the acid directly, the pH of the reacted mixture, or the reaction products. One expected reaction product can be carbon dioxide which may be monitored with a tool and/or sensor. If the tool is placed on the inlet of the pump, fluid produced during the reaction may be withdrawn into the tool, analyzed, and used to monitor the reaction. The reaction may be monitored with time to determine reaction kinetics, which can be used when creating acid stimulation improved oil recovery designs. If the reaction time has not expired, operations remain at block 818. Otherwise, operations of the flowchart return to block 812 for another injection of acid. In some embodiments, the two mobility tests are performed at a same or approximately same location.

At block 820, viability of the formation to acid stimulation can be determined by comparison of the first mobility to the second mobility to determine the effectiveness of the acid treatment. In some embodiments, a sample of the spent acid may be collected for analysis. In some embodiments, formation fluid may be captured. For example, with reference to FIG. 1B, the logging tool 134 can collect the sample. The logging tool 134 and/or a computing device at the surface of the borehole can make this determination. The formation fluid may be analyzed and tested for compatibility with the acid treatment. Some samples of spent acid may be collected for laboratory analysis. Such analysis includes determining a reaction extent, products of the reaction, and dissolved formation constituents, and may help design an improved acid stimulation improved oil recovery. Multiple zones may also be tested for acid stimulation along single or multiple trips in the same or adjacent wells in order to map the formation for acid stimulation viability, trends, and heterogeneity. Injection locations may in part be determined by mobility results of tests either before and or after acidizing from other locations including the level of acidizing success form various locations. Such results may be compared spatially. Such spatial analysis may provide overall stimulation strategies for the well or field or provide additional locations that need to be tested. Operations of the flowchart 800 are complete.

The flowchart is provided to aid in understanding the illustrations and are not to be used to limit scope of the claims. The flowchart depicts example operations that can vary within the scope of the claims. Additional operations may be performed; fewer operations may be performed; the operations may be performed in parallel; and the operations may be performed in a different order. For example, while described such that an acid remains in an acid-resistant container until the acid is emitted into a formation, in some embodiments the acid can be released from the acid-resistant container at any point after placing the acid-resistant container into a sample chamber housing acid-resistant containers and the sample chamber being sealed. In some embodiments, the operations at block 808 may be performed prior to the operations at block 802. In embodiments wherein an acid-resistant fluid is stored with the acid, the operations at blocks 808 and 812 may be performed simultaneously, as the portion of the downhole tool can be coated as the acid is being injected. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

While the aspects of the disclosure are described with reference to various implementations and exploitations, it will be understood that these aspects are illustrative and that the scope of the claims is not limited to them. In general, techniques for acid injection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowchart is provided to aid in understanding the illustrations and is not to be used to limit scope of the claims. The flowchart depicts example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

While the aspects of the disclosure are described with reference to various implementations and exploitations, it will be understood that these aspects are illustrative and that the scope of the claims is not limited to them. In general, techniques for coating portions of a downhole tool for stimulating formation production using acid injection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Embodiment 1: A downhole tool comprising a chamber, at least one acid resistant container to store a stimulation fluid comprising a stimulation acid, wherein the at least one acid resistant container is to be placed in the chamber prior to conveying the downhole tool in a borehole; and a fluid injector fluidly coupled to an output of the chamber, wherein, after the downhole tool is positioned at a location in the borehole where the stimulation fluid is to be injected into a subsurface formation surrounding the borehole, the at least one acid resistant container is to be opened such that the stimulation fluid is to flow from the output of the chamber to the fluid injector and the fluid injector is to inject the stimulation fluid into the subsurface formation.

Embodiment 2: The downhole tool of Embodiment 2, wherein an interior of the chamber is coated with an acid-resistant coating.

Embodiment 3: The downhole tool of Embodiments 1 or 2, further comprising a flow line that fluidly couples the output of the chamber to the fluid injector, wherein the flow line is to be coated with an acid resistant fluid prior to the stimulation fluid being injected from the fluid injector, via the flow line, and out into the subsurface formation that is surrounding the borehole in which the downhole tool is positioned.

Embodiment 4: The downhole tool of Embodiment 3, wherein an acid neutralizing fluid is to flow through the flow line after the stimulation fluid is injected out into the subsurface formation.

Embodiment 5: The downhole tool of Embodiment 4, wherein the acid neutralizing fluid is to flow through the chamber after the stimulation fluid is injected out into the subsurface formation.

Embodiment 6: The downhole tool of Embodiments 4 or 5, wherein the downhole tool is part of a drill string having a drill bit to drill the borehole and through which a drilling mud flows, and wherein the acid neutralizing fluid comprises the drilling mud.

Embodiment 7: The downhole tool of any one of Embodiments 3-6, further comprising a coating container fluidly coupled to the flow line, wherein the coating container is to store the acid resistant fluid, wherein the acid resistant fluid is to be released from the coating container to coat the flow line after the downhole tool is in the borehole.

Embodiment 8: The downhole tool of any one of Embodiments 3-6, wherein the borehole is located at a well site for hydrocarbon recovery from the subsurface formation, wherein the flow line is to be coated with the acid resistant fluid at the well site prior to the downhole tool being positioned in the borehole.

Embodiment 9: The downhole tool of any one of Embodiments 3-6, wherein the stimulation fluid comprises the acid resistant fluid.

Embodiment 10: A downhole tool comprising a chamber; at least one acid resistant container to store a stimulation fluid comprising stimulation acid, wherein the at least one acid resistant container is to be placed in the chamber prior to conveying the downhole tool in a borehole; a fluid injector fluidly coupled to an output of the chamber; a piston; and a pump positioned in the downhole tool such that the stimulation acid does not contact the pump, wherein, after the downhole tool is positioned at a location in the borehole where the stimulation acid is to be injected into a subsurface formation surrounding the borehole, the pump is to activate to push the piston in the chamber to burst the at least one acid resistant container such that the stimulation acid is to flow from the output of the chamber to the fluid injector and the fluid injector is to inject the stimulation acid into the subsurface formation.

Embodiment 11: The downhole tool of Embodiment 10, wherein the stimulation fluid comprises an acid resistant fluid.

Embodiment 12: The downhole tool of Embodiment 10, further comprising a flow line that fluidly couples the output of the chamber to the fluid injector, wherein the flow line is to be coated with an acid resistant fluid prior to the stimulation fluid being injected from the fluid injector, via the flow line, into the subsurface formation that is surrounding the borehole in which the downhole tool is positioned.

Embodiment 13: The downhole tool of Embodiment 12, wherein an acid neutralizing fluid is to flow through the flow line after the stimulation fluid is injected out into the subsurface formation.

Embodiment 14: A method comprising placing at least one acid-resistant container in a chamber of a downhole tool, the at least one acid-resistant container to store a stimulation fluid comprising stimulation acid; conveying the downhole tool in a borehole to a location where the stimulation fluid is to be injected into a subsurface formation surrounding the borehole; opening the at least one acid-resistant container after the downhole tool is positioned at the location where the stimulation fluid is to be injected into the subsurface formation; and injecting the stimulation fluid into the subsurface formation.

Embodiment 15: The method of Embodiment 14, wherein injecting the stimulation fluid comprises injecting the stimulation fluid from a fluid injector that is fluidly coupled to an output of the chamber via a flow line of the downhole tool, and wherein the method comprises coating the flow line with an acid resistant fluid prior to injecting the stimulation fluid.

Embodiment 16: The method of Embodiment 15, further comprising flowing an acid neutralizing fluid into the flow line after the injecting of the stimulation fluid.

Embodiment 17: The method of Embodiment 16, further comprising flowing the acid neutralizing fluid into the chamber after the injecting of the stimulation fluid.

Embodiment 18: The method of Embodiments 16 or 17, further comprising drilling, using a drill string through which a drilling mud flows and that includes the downhole tool, wherein the acid neutralizing fluid comprises the drilling mud.

Embodiment 19: The method of any one of Embodiments 15-18, wherein coating the flow line comprises releasing the acid resistant fluid from a coating container in the downhole tool after the downhole tool is conveyed downhole.

Embodiment 20: The method of Embodiment 14, wherein the stimulation fluid comprises an acid resistant fluid.

What is claimed is:

1. A downhole tool comprising:
a chamber configured to receive at least one acid resistant container;
the at least one acid resistant container configured for placement in the chamber and configured to store a stimulation fluid comprising a stimulation acid, wherein the at least one acid resistant container is to be placed in the chamber prior to conveying the downhole tool in a borehole; and
a fluid injector fluidly coupled to an output of the chamber,
wherein, after the downhole tool is positioned at a location in the borehole where the stimulation fluid is to be injected into a subsurface formation surrounding the borehole, the at least one acid resistant container is to be opened such that the stimulation fluid is to flow from the output of the chamber to the fluid injector and the fluid injector is to inject the stimulation fluid into the subsurface formation.

2. The downhole tool of claim 1, wherein an interior of the chamber is coated with an acid-resistant coating.

3. The downhole tool of claim 1, further comprising:
a flow line that fluidly couples the output of the chamber to the fluid injector, wherein the flow line is to be coated with an acid resistant fluid prior to the stimulation fluid being injected from the fluid injector, via the flow line, and out into the subsurface formation that is surrounding the borehole in which the downhole tool is positioned.

4. The downhole tool of claim 3, wherein an acid neutralizing fluid is to flow through the flow line after the stimulation fluid is injected out into the subsurface formation.

5. The downhole tool of claim 4, wherein the acid neutralizing fluid is to flow through the chamber after the stimulation fluid is injected out into the subsurface formation.

6. The downhole tool of claim 4,
wherein the downhole tool is part of a drill string having a drill bit to drill the borehole and through which a drilling mud flows, and
wherein the acid neutralizing fluid comprises the drilling mud.

7. The downhole tool of claim 3, further comprising:
a coating container fluidly coupled to the flow line, wherein the coating container is to store the acid resistant fluid, wherein the acid resistant fluid is to be released from the coating container to coat the flow line after the downhole tool is in the borehole.

8. The downhole tool of claim 3, wherein the borehole is located at a well site for hydrocarbon recovery from the subsurface formation, wherein the flow line is to be coated with the acid resistant fluid at the well site prior to the downhole tool being positioned in the borehole.

9. The downhole tool of claim 3, wherein the stimulation fluid comprises the acid resistant fluid.

10. A downhole tool comprising:
a chamber configured to receive at least one acid resistant container;
the at least one acid resistant container configured for placement in the chamber and configured to store a stimulation fluid comprising stimulation acid, wherein the at least one acid resistant container is to be placed in the chamber prior to conveying the downhole tool in a borehole;
a fluid injector fluidly coupled to an output of the chamber;
a piston; and
a pump positioned in the downhole tool such that the stimulation acid does not contact the pump,
wherein, after the downhole tool is positioned at a location in the borehole where the stimulation acid is to be injected into a subsurface formation surrounding the borehole, the pump is to activate to push the piston in the chamber to burst the at least one acid resistant container such that the stimulation acid is to flow from the output of the chamber to the fluid injector and the fluid injector is to inject the stimulation acid into the subsurface formation.

11. The downhole tool of claim 10, wherein the stimulation fluid comprises an acid resistant fluid.

12. The downhole tool of claim 10, further comprising:
a flow line that fluidly couples the output of the chamber to the fluid injector, wherein the flow line is to be coated with an acid resistant fluid prior to the stimulation fluid being injected from the fluid injector, via the flow line, into the subsurface formation that is surrounding the borehole in which the downhole tool is positioned.

13. The downhole tool of claim 12, wherein an acid neutralizing fluid is to flow through the flow line after the stimulation fluid is injected out into the subsurface formation.

14. A method comprising:
placing, within a downhole tool, at least one acid-resistant container in a chamber configured to receive the at least one acid resistant container, wherein the at least one acid-resistant container is configured for placement in the chamber and configured to store a stimulation fluid comprising stimulation acid;
conveying the downhole tool in a borehole to a location where the stimulation fluid is to be injected into a subsurface formation surrounding the borehole;

opening the at least one acid-resistant container after the downhole tool is positioned at the location where the stimulation fluid is to be injected into the subsurface formation; and injecting the stimulation fluid into the subsurface formation.

15. The method of claim 14,
wherein injecting the stimulation fluid comprises injecting the stimulation fluid from a fluid injector that is fluidly coupled to an output of the chamber via a flow line of the downhole tool, and wherein the method comprises:
coating the flow line with an acid resistant fluid prior to injecting the stimulation fluid.

16. The method of claim 15, further comprising:
flowing an acid neutralizing fluid into the flow line after the injecting of the stimulation fluid.

17. The method of claim 16, further comprising:
flowing the acid neutralizing fluid into the chamber after the injecting of the stimulation fluid.

18. The method of claim 16, further comprising:
drilling, using a drill string through which a drilling mud flows and that includes the downhole tool, wherein the acid neutralizing fluid comprises the drilling mud.

19. The method of claim 15, wherein coating the flow line comprises releasing the acid resistant fluid from a coating container in the downhole tool after the downhole tool is conveyed downhole.

20. The method of claim 14, wherein the stimulation fluid comprises an acid resistant fluid.

* * * * *